United States Patent
Kervagoret

[11] Patent Number: 5,136,929
[45] Date of Patent: Aug. 11, 1992

[54] DEVICE FOR THE CONTROL OF A DOUBLE-ACTING HYDRAULIC JACK

[75] Inventor: Gilbert Kervagoret, Argenteuil, France

[73] Assignee: Bendix Europe Services Techniques, Drancy, France

[21] Appl. No.: 691,759

[22] Filed: Apr. 26, 1991

[30] Foreign Application Priority Data

May 31, 1990 [FR] France ............... 90-06773

[51] Int. Cl.⁵ .................. F15B 11/08; F15B 13/04
[52] U.S. Cl. ........................... 91/420; 91/422; 91/433
[58] Field of Search ............ 91/6, 19, 20, 27, 420, 91/422, 433, 462; 60/413, 417, 403, 404, 406

[56] References Cited

U.S. PATENT DOCUMENTS

| | | | |
|---|---|---|---|
| 2,241,077 | 5/1941 | Thoma | 91/20 |
| 2,352,470 | 6/1944 | Carlton | 91/19 |
| 3,164,064 | 1/1965 | Carson | 91/20 |
| 4,085,587 | 4/1978 | Garlinghouse | 60/403 |
| 4,953,445 | 9/1990 | Kervagoret et al. | 60/404 X |

FOREIGN PATENT DOCUMENTS

| | | | |
|---|---|---|---|
| 334723 | 9/1989 | European Pat. Off. | |
| 3811312 | 10/1989 | Fed. Rep. of Germany. | |
| 848883 | 8/1939 | France | 91/19 |
| 62-71758 | 2/1987 | Japan | |

Primary Examiner—Edward K. Look
Assistant Examiner—John Ryznic
Attorney, Agent, or Firm—Larry J. Palguta; Ken C. Decker

[57] ABSTRACT

A device for the control of a double-acting hydraulic jack (10) comprises in a main circuit, a distributor assembly (28, 28', 34, 34') electrically controlled and commanding the putting of each of the two chambers (14, 16) of the jack selectively in relation with a source of fluid under high pressure (20, 26) or with a reservoir of fluid at low pressure (24), and an auxiliary circuit controlled by a mechanism (76) sensitive to the position of the piston (12) of the jack (10). The auxiliary circuit comprises a slide distributor (50) which ensures the return of the piston (12) of the jack (10) into a rest position in the event of a failure of the electrical control mechanism by governing the distributor assembly (34, 34') of the main circuit.

5 Claims, 2 Drawing Sheets

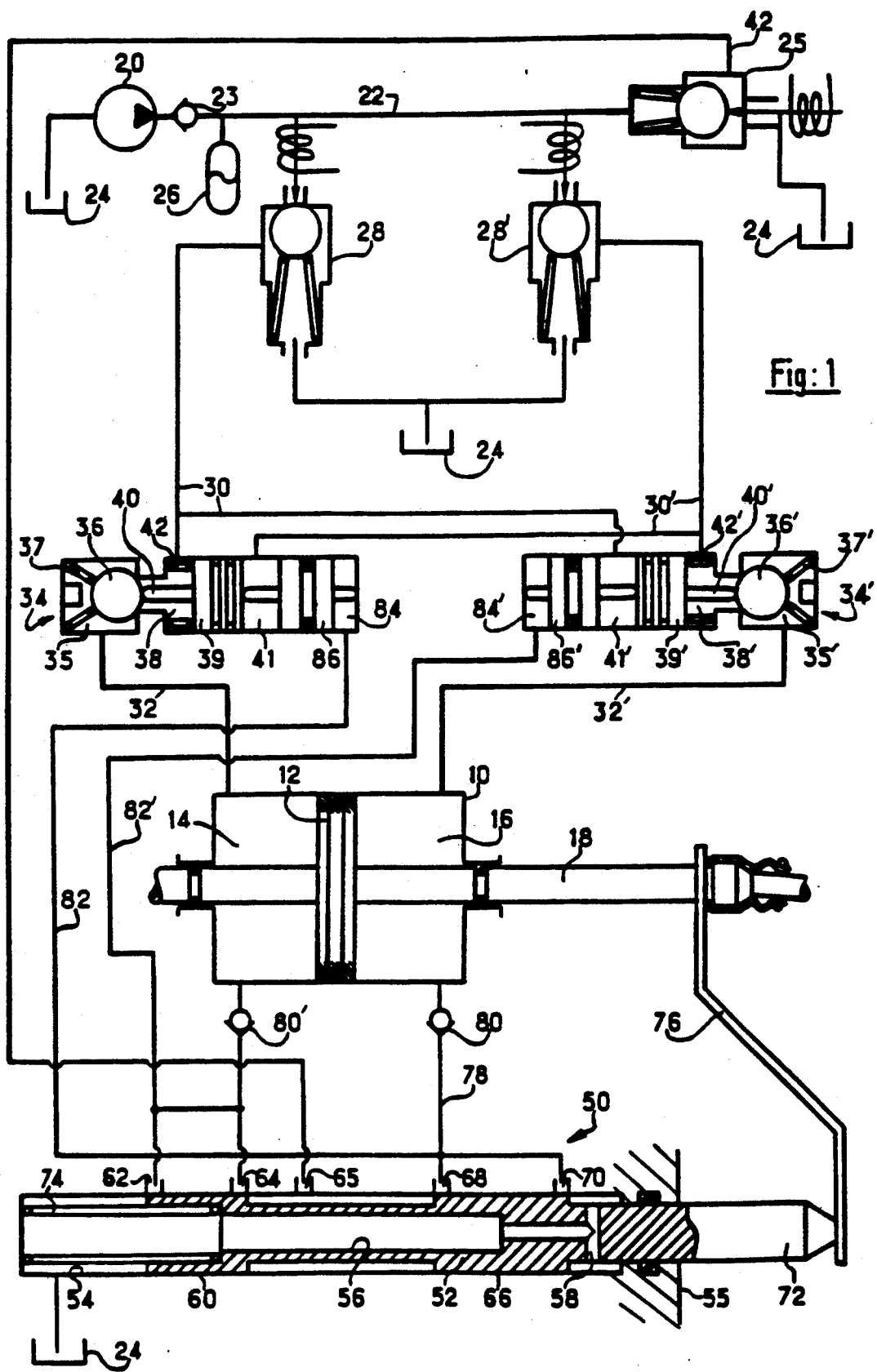
Fig: 1

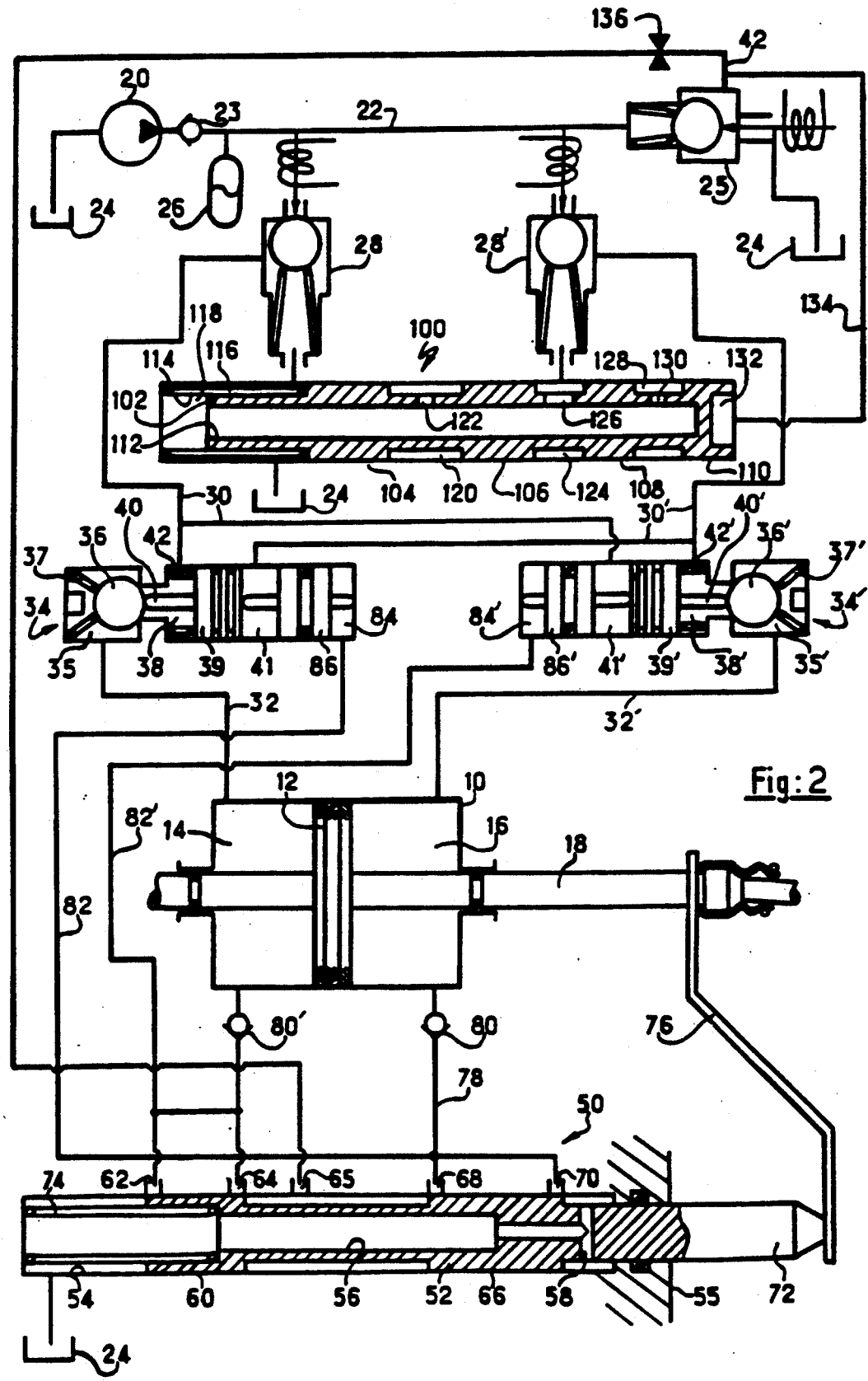
Fig: 2

DEVICE FOR THE CONTROL OF A DOUBLE-ACTING HYDRAULIC JACK

BACKGROUND OF THE INVENTION

The present invention relates to a device for the control of a double-acting hydraulic jack, of the type comprising, in a main circuit, a distributor assembly controlled by electrical means and commanding the putting of each of the two chambers of the jack selectively in relation with a source of fluid under high pressure or with a reservoir of fluid at low pressure, and an auxiliary circuit controlled by means sensitive to the position of the piston of the jack.

In many uses, it is desirable, in the event of a failure, that the piston of the jack should return automatically to the rest position, for example to the mid-position where a double-acting jack is concerned. U. S. Pat. No. 4,953,445 makes known a device for the control of a double-acting hydraulic jack, in which, according to one embodiment, a failure in the hydraulic circuit under high pressure causes the piston of the jack to be blocked in the position which it occupied before the failure, an arrangement being provided in the event of a failure of the electrical control circuit only according to another embodiment. This letter embodiment makes it necessary to mount a device for detecting the position of the piston of the jack and therefore to equip the jack with two plugs of complex form, through which the output rod of the jack passes and which are equipped with distributors. The slides of these distributors must be machined with very high accuracy, typically of the order of a micron, and moreover must be paired very exactly in order to ensure that the device has perfect symmetry. In fact, in the event of a failure, each distributor must be capable of ensuring the admission of fluid under pressure into one of the chambers of the 15 jack, while the other distributor must make it possible to discharge exactly the same volume of fluid contained in the other chamber toward a low-pressure reservoir, so that the return movement of the jack piston is obtained with complete reliability.

SUMMARY OF THE INVENTION

An object of the invention is, therefore, to provide a device for the control of a double-acting hydraulic jack, in which the return of the piston to the rest position is obtained automatically in the event of a failure of the electrical control means, without modifications of the jack itself, simply and reliably and without the need for costly machining.

To achieve this, according to the invention the auxiliary circuit comprises a slide distributor which ensures the return of the piston of the jack into its rest position in the event of a failure of the electrical control means by governing the distributor assembly of the main circuit.

BRIEF DESCRIPTION OF THE DRAWING

The invention will now be described by way of example with reference to the accompanying drawings in which:

FIG. 1 shows a theoretical diagram of an embodiment of the invention,

FIG. 2 shows a theoretical diagram of an alternative version of the embodiment of FIG. 1,

DETAILED DESCRIPTION OF THE INVENTION

FIG. 1 illustrates a double-acting jack 10 divided into two chambers 14 and 16 of variable volume by means of a piston 12. The piston is mounted on a rod 18. The hydraulic feed is obtained by means of a pump 20 connected to a feed pipe 22 via a non-return valve 23. The feed pipe 22 is likewise connected to a pressure accumulator 26.

The main control circuit comprises, for the chamber 14, a three-way solenoid valve 28 which puts a pipe 30 in communication either with the high-pressure pipe 22 or with a reservoir 24. When the solenoid valve 28 is not excited, it puts the pipe 30 in communication with the reservoir 24. The main control circuit likewise comprises, for the chamber 16, a three-way solenoid valve 28' which puts a pipe 30' in communication either with the high-pressure pipe 22 or with the reservoir 24. When the solenoid valve 28' is not excited, it puts the pipe 30' in communication with the reservoir 24.

The main control circuit can be controlled by means of a computer or microprocessor (not shown) which controls each of the solenoid valves 28, 28', the pump 20 and a three-way safety solenoid valve 25 located between the high-pressure pipe and the low-pressure reservoir 24. In normal operation, the solenoid valve 25 is excited and interrupts communication between the high-pressure pipe 22 and the reservoir 24. The function of this solenoid valve 25 will be explained later.

The pipe 30 is connected to the feed pipe 32 of the chamber 14 by means of a double-acting controlled valve 34. This valve 34 has a first chamber 35, into which the pipe 32 opens and which contains a ball 36 loaded by a spring 37 toward a rest position, where it prevents communication with a second chamber 38 into which the pipe 30 opens. The second chamber 38 is delimited by a piston 39 carrying, on one side, a needle 40 capable of lifting the ball 36 from its seat when the pressure in a third chamber 41 on the other side of the piston 39 causes the latter to move counter to a return spring 42 located in the second chamber 38. It will thus be seen that the valve 34 is controlled by the pressure prevailing in the pipe 30' symmetrical with the pipe 30 in the circuit corresponding to the second chamber 16 of the jack. This latter circuit has a double-acting valve 34' identical to the valve 34, and therefore its elements bearing the same reference numerals given a "dash" need not be described in detail.

If, for example, it is desired that the piston of the jack should move to the right, as seen in FIG. 1, the pump 20 is activated, the solenoid valve 28 is excited, the solenoid valve 28' is left at rest and the safety solenoid valve 25 is excited. The pressure in the pipe 22 is therefore transmitted into the pipe 30 and into the second chamber 38. The ball 36 lifts under the action of this pressure which is thus transmitted by the pipe 32 to the chamber 14 of the jack, then performing the function of the control chamber of the jack. Simultaneously, the pressure in the pipe 30 is transmitted to the third chamber 41' of the valve 34', the effect of this being to cause the piston 39' to move to the right, as seen in the figure, and therefore to lift the ball 36'from its seat, thereby making communication between the first and second chambers 35' and 38' and therefore between the pipes 32' and 30'. Since the solenoid valve 28' is not excited, the pipe 30' communicates with the reservoir 24, and consequently the chamber 16 of the jack is in the controlled-chamber position and is therefore connected to the reservoir. The piston 12 can thus move to the right. The functioning of the main control circuit just described with regard to the movement of the piston of the jack in one direction is correspondingly identical as regards the movement of the piston of the jack in the other direction and therefore will not be described in detail.

Thus, the chambers 14 and 16 are alternately one under pressure and the other connected to the reservoir. However, if the two solenoid valves 28, 28' are at rest, the two chambers 14 and 16 are kept isolated as a result of the closing of the valves 34, 34'.

It will be noted, in passing, that this advantageous arrangement of the controlled valves 34 and 34' makes it possible to avoid providing non-return valves in the pipes 30 and 30'.

Should the pressure fall in the high-pressure pipe 22 during an actuation of the jack, this would cause the closing of the valve 34 or 34' which was open and consequently the automatic isolation of the chambers 14 and 16 and therefore the immobilization of the piston 12 in the position which it occupied at the moment when a fault in the hydraulic circuit occurred.

Should a failure occur in the electrical control device of the solenoid valves either during an actuation of the jack or when the main control circuit has already failed hydraulically, the auxiliary circuit comes into effect, as will now be described, in order to return the piston of the jack automatically into its rest position.

On the most pessimistic assumption, a breakdown of the electrical control circuit results in a stop of the functioning of the pump 20, and the solenoid valves 28, 28' and 25 are no longer excited. The solenoid valve 25 is therefore in the rest position and opens communication between the high-pressure pipe 22 and a pipe 42 which, when the solenoid valve 25 was excited, communicated with the reservoir 24. The solenoid valve 25 thereby interrupts communication between the reservoir 24 and the pipe 42. The pipe 42 then connects the pressure accumulator 26 to a distributor 50 consisting of a slide 52 sliding in a bore 54 formed in a body 55. The slide 52 is itself pierced with an axial bore 56 opening into a radial bore 58. The slide 52 has a bearing surface 60 interacting with ports 62 and 64 and a bearing surface 66 interacting with ports 68 and 70.

Furthermore, a port 65 is provided between the bearing surfaces 60 and 66 so as never to be covered by either one of these.

The slide 52 has a control rod 72 projecting sealingly outside the body 55 and is subjected to the action of a return spring 74 tending to cause the control rod 72 to emerge from the body 55 in such a way that it bears on a member 76 fixed to the rod 18 of the piston 12. It can therefore be appreciated that the movements of the slide 52 are identical to those of the rod 18 and consequently to those of the piston 12.

If the jack was moved to the right (as seen in FIG. 1) at the moment when the failure of the electrical control circuit occurred, the slide 52 is therefore itself moved to the right under the action of the spring 74. In this position, the port 68 is exposed by the bearing surface 66, while the port 70 is covered by this bearing surface. Likewise, the bearing surface 60 exposes the port 62 and covers the port 64.

It was seen above that the result of a failure of the electrical control circuit is that the accumulator 26 is put, under pressure, in relation with the pipe 42. This pipe is connected to the still exposed port 65, and the fluid under pressure can thus be transmitted to the chamber 16 of the jack by means of the exposed port 68 and a pipe 78 on which a non-return valve 80 is arranged, the non-return valve 80 being transmitting in this direction. The fluid under pressure is likewise transmitted to a fourth chamber 84 of the controlled valve 34 by means of a pipe 82 connected to the pipe 78. This fourth chamber 84 is separated from the third chamber 41 by a piston 86 which, under the effect of the increase of pressure in the chamber 84, advances to the left, as seen in FIG. 1, at the same time pushing the piston 39 which itself lifts the ball 36 from its seat. The chamber 14 of the jack is therefore connected to the reservoir 24 by means of the pipes 32 and 30 and the solenoid valve 28 which is in the rest position. The piston 12 of the jack can consequently move to the left, as seen in FIG. 1, under the effect of the pressure in the chamber 16, toward its rest position. During this movement, the piston drives the control rod 72 of the slide 52 by means of the member 76, until the bearing surface 66 shuts off the port 68, thereby interrupting the supply of fluid under pressure to the chamber 16, the piston 12 then stopping in its rest position.

During the return movement of the piston 12 and of the slide 52, the port 62 is exposed by the bearing surface 60 and thus communicates with the volume delimited by the bores 54 and 56 and itself in communication with the reservoir 24. It therefore follows that no pressure prevails in the pipe 82' and the chamber 84'. Because no pressure prevails in the chamber 41' either since the solenoid valve 28 is closed and puts it in communication with the reservoir 24, it is thus certain that the ball 36' will remain laid against it seat by the spring 37' and thereby prevent any loss of fluid from the chamber 16 of the jack toward the reservoir 24.

Likewise, during this return movement, the chamber 84 of the valve 34 is always subjected by the pipe 82 communicating with the port 68 to the same pressure as that which is communicated to the chamber 16. It is therefore certain that the ball 36 will remain lifted from its seat and allow the discharge of the fluid from the chamber 14 toward the reservoir 24.

The functioning of the auxiliary control circuit in the event of a failure of the electrical control circuit occurring when the piston of the jack is on the left is correspondingly identical and therefore will not be described in detail.

It will therefore be seen that, by means of the invention, a failure of the electrical circuit results automatically, under all circumstances, in the supply of fluid under pressure from the accumulator 26 toward the appropriate chamber of the jack by way of the distributor 50, while the fluid contained in the other chamber of the jack can return to the reservoir 24 by way of the main control circuit, namely the controlled valve 34 or 34' and the solenoid valve 28 or 28'. In the event of electrical failure, the feed and discharge circuits of the jack are thus controlled by a single distributor, the machining of which no longer needs to be carried out in a critical manner. Experience has shown that tolerances of 20 to 30 microns currently obtained allow a fully satisfactory functioning of the distributor.

Moreover, it is advantageous to have the possibility of producing the slide of the distributor with such tolerances, since internal leaks then occur and are even desirable because they ensure the axial balancing of the slide.

The distributor 50, the operation of which has just been described, performs no function during normal operation, that is to say outside of failure. In fact, since the solenoid valve 25 is excited, the pipe 42 is therefore connected to the reservoir 24. The space between the bearing surfaces 60 and 66 is consequently at the same pressure as the reservoir, as is the space delimited by the bores 54 and 56. The distributor 50 as a whole is therefore subjected to a single pressure and can consequently follow the movements of the piston 12 and of the rod 18, without disturbing them. Thus, in the off-center position, the chamber 84 is at the pressure of the reservoir 24 via the pipe 82 and the port 68 or 70, as is the chamber 84' via the pipe 82' and the port 62 or 64. The pistons 86 and 86' of the valves 34 and 34'are therefore inoperative during functioning outside failure, so that the main control circuit functions as though the distributor 50 did not exist. Likewise, the above-mentioned internal leaks mean that, in the centered position, the chambers 84 and 84' are also at the pressure of the reservoir 24 and the system is therefore perfectly balanced.

Another advantage of the invention is that it allows a non-symmetrical embodiment of the distributor. In fact, it is sufficient for the slide 52 to be capable of following the stroke of the jack piston in only one direction (to the left in the figure), while its stroke can very easily be limited in the other direction, the control rod 72 following the member 76 by means of the spring 74 only over some of its path allowing the opening of 62 and 68, and then coming away from it over the rest of the path. This makes it possible to obtain a considerable reduction in the overall size of the distributor.

Yet another advantage of the invention is that the distributor 50 can be placed at any location in relation to the control circuit of the jack or to the jack itself, provided only that the slide is controlled by a member following the movements of the piston of the jack.

There can be a device for braking the return movement of the piston 12 to prevent it from being too abrupt. It is possible, for example, to arrange a restriction in the pipe between the solenoid valves 28 and 28' and the reservoir 24. However, this restriction would also brake the movement of the piston 12 during normal operation.

FIG. 2 illustrates an alternative version of the embodiment of FIG. 1, where the same elements bear the same reference numerals. The functioning of the device of FIG. 2 is identical, in the normal mode or in the event of a failure, to that of FIG. 1 and therefore will not be explained in detail. The difference is in the addition of a distributor 100 in the circuit between the solenoid valves 28 and 28' and the reservoir 24. The distributor 100 is composed of a slide 102 with four bearing surfaces 104, 106, 108 and 110 and formed internally with a blind bore 112. The slide 102 slides in a bore 114 and is returned to rest position by a spring 116.

The bearing surface 104 defines with the bore 114 a chamber 118 in which the spring 116 is arranged and which communicates with the reservoir 24 and the interior of the bore 112. The bearing surfaces 104 and 106 between them define an annular chamber 120 communicating with the interior of the blind bore 112 via a duct 122 functioning as a restriction. The bearing surfaces 106 and 108 between them define an annular chamber 124 in communication via an orifice 126 with the interior of the blind bore 112. The bearing surfaces 108 and 110 between them define an annular chamber 128 communicating with the interior of the blind bore 112 via a duct 130 functioning as a restriction. The bearing surface 110 defines with the bore 114 a chamber 132 connected to the pipe 42 by means of a pipe 134. In the rest position shown, the outlet of the solenoid valve 28 toward the reservoir 24 opens into the chamber 118, and the outlet of the solenoid valve 28' toward the reservoir 24 opens into the chamber 124.

During normal operation, that is to say when the solenoid valve 25 is excited, it was seen that the pipe 42 is connected to the reservoir 24. This is therefore also true of the pipe 134 and the chamber 132. The solenoid valve 28 or 28' which is not excited consequently puts the controlled chamber 14 or 16 respectively in communication with the reservoir 24 via the chamber 118 or the chamber 124, the orifice 126 and the bore 112 respectively. Everything therefore happens exactly as though the distributor 100 were absent.

In contrast, in the event of an electrical failure, the solenoid valve 25 returns to the rest position and allows the accumulator 26 to discharge into the pipe 42. There is therefore simultaneously a pressure increase in the pipe 134 and in the chamber 132. Since the chamber 118 is constantly connected to the reservoir 24, the slide 102 is therefore subjected to a pressure difference and moves to the left (in FIG. 2), in such a way that the pipe coming from the solenoid valve 28 opens into the chamber 120 and the pipe coming from the solenoid valve 28' opens into the chamber 128. These two chambers 120 and 128 each have a restriction 122 and 130 leading respectively toward the interior of the bore 112 and the reservoir 24. Thus, during functioning in the event of an electrical failure, the circuit via which the fluid discharges from one of the chambers 14 or 16 of the jack has a restriction 122 or 130 slowing the flow of fluid toward the reservoir and therefore also the return movement of the piston 12 toward its rest position.

The braking of the return movement of the piston 12 can be further improved by arranging a fixed restriction 136 on the pipe 42 downstream of the connection with the pipe 134. Such a restriction 136 performs the double function of slowing the supply of fluid under pressure to the distributor 50 and to one of the chambers 14 or 16 of the jack and of ensuring a rapid movement of the slide 102 since the chamber 132 then instantaneously receives the entire pressure rise attributable to the discharge of the accumulator 26.

There has therefore indeed been provided, according to the invention, a device for the control of a double-acting hydraulic jack, in which the return of the piston to the rest position is obtained automatically in the event of a failure of the electrical control means in an especially simple and reliable way involving only a little outlay.

The invention, although described in relation to two embodiments, is capable of receiving many modifications which will appear to an average person skilled in the art. For example, the slide of the distributor 50 can follow the movements of the piston 12 of the jack by means of a gearing down so as to reduce the overall size of the distributor 50 even further.

What we claim is:

1. A device for the control of a double-acting hydraulic jack having two chambers and a piston therebetween, comprising in a main circuit a distributor assembly controlled by electrical control means and the distributor assembly controlling the selective communication of each of the two chambers of the jack with one of a source of fluid under high pressure and a reservoir of fluid at low pressure, the distributor assembly comprising, for each chamber of the jack, a three-way solenoid valve which, in a first position, connects a feed pipe of the respective chamber to the source of fluid under high pressure and, in a second position, connects the feed pipe to the fluid reservoir, and a controlled valve, for each chamber of the jack, which connects one chamber of the jack to the reservoir when the feed pipe of the other chamber is connected to the source of fluid under high pressure, and an auxiliary circuit controlled by means sensitive to the position of the piston of the jack, the auxiliary circuit comprising a slide distributor controlled by the position of the piston of the jack and which, in the case of a failure of the electrical control means, communicates with and controls the distributor assembly of the main circuit such that the controlled valve of the distributor assembly of the main circuit connects one chamber of the jack to the reservoir when the slide distributor connects the other chamber of the jack to the source of fluid under high pressure.

2. The device according to claim 1, characterized in that means are provided for slowing the return of the piston of the jack into the rest position.

3. The device according to claim 2, wherein the slowing means comprises a restriction located between the source of fluid under high pressure and the slide distributor.

4. The device according to claim 3, wherein the slowing means comprises a restriction located between a chamber of the jack and the reservoir.

5. The device according to claim 4, wherein the restriction becomes effective between a chamber of the jack and the reservoir only in the event of a failure of the electrical control means.

* * * * *